United States Patent [19]
Allen

[11] Patent Number: 5,461,849
[45] Date of Patent: Oct. 31, 1995

[54] VERSI-RAKE ATTACHMENT

[76] Inventor: Roy L. Allen, 9811 N. 17th Dr., Phoenix, Ariz. 85021

[21] Appl. No.: 258,544

[22] Filed: Jun. 10, 1994

[51] Int. Cl.⁶ ................................................ A01D 11/06
[52] U.S. Cl. .................... 56/400.06; 56/400.19; 7/114; 172/375
[58] Field of Search ............... 56/400.06, 400.04, 56/400.05, 400.07, 400.19; 172/373, 374, 375; 7/114

[56] References Cited

U.S. PATENT DOCUMENTS

| | | | |
|---|---|---|---|
| 3,221,485 | 12/1965 | Jenkins | 7/114 X |
| 4,212,150 | 7/1980 | Dmochowski | 56/400.06 |
| 5,185,992 | 2/1993 | Garcia | 172/375 X |

*Primary Examiner*—Terry Lee Melius

[57] ABSTRACT

A new and improved versi-rake attachment comprising a clamp adapted to be secured to a handle of a tool. Two apertures are formed on the clamp. Two thumb screws are adapted to be received through the apertures formed on the clamp. The two thumb screws function to secure or release the clamp from the handle of the tool. A plurality of small spikes are integral with the clamp. The small spikes function to grasp the handle of the tool and prevent the clamp from rotating. The device contains a bracket having a generally rectangular configuration. The bracket is secured to the outer surface of the clamp. Two apertures are formed on the bracket. The device also has a tool head portion having two apertures formed therethrough. The two apertures correspond with the two apertures formed on the bracket. Two inner thumb screws are adapted to be received through the two apertures formed in the bracket and the two apertures formed in the tool head. The two inner thumb screws function to removably secure the tool head to the bracket.

2 Claims, 4 Drawing Sheets 5,461,849

VERSI-RAKE ATTACHMENT

BACKGROUND OF THE INVENTION

1. Field of the Invention

The present invention relates to a versi-rake attachment and more particularly pertains to performing a combination of garden or lawn tasks simultaneously with a versi-rake attachment.

2. Description of the Prior Art

The use of gardening tools is known in the prior art. More specifically, gardening tools heretofore devised and utilized for the purpose of gardening are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 274,116 to Lidikay et al. discloses the design of a garden hoe and rake combination, or similar article.

U.S. Pat. No. 4,602,474 to Palumbo discloses an adjustable hoe attachment for rake.

U.S. Pat. No. Des. 293,875 to Roper discloses the design of a combined hoe and rake head assembly.

U.S. Pat. No. 4,730,679 to Tallerico et al. discloses a garden tool with hoe parts, pointed nose and arched projections.

U.S. Pat. No. 5,003,760 to Webb discloses a garden tool.

While these devices fulfill their respective, particular objective and requirements, the aforementioned patents do not describe a versi-rake attachment that performs a combination of garden or lawn tasks simultaneously.

In this respect, the versi-rake attachment according to the present invention substantially departs from the conventional concepts and designs of the prior art, and in doing so provides an apparatus primarily developed for the purpose of performing a combination of garden or lawn tasks simultaneously.

Therefore, it can be appreciated that there exists a continuing need for a new and improved versi-rake attachment which can be used for performing a combination of garden or lawn tasks simultaneously. In this regard, the present invention substantially fulfills this need.

SUMMARY OF THE INVENTION

In the view of the foregoing disadvantages inherent in the known types of gardening tools now present in the prior art, the present invention provides an improved versi-rake attachment. As such, the general purpose of the present invention, which will be described subsequently in greater detail, is to provide a new and improved versi-rake attachment and method which has all the advantages of the prior art and none of the disadvantages.

To attain this, the present invention essentially comprises a new and improved versi-rake attachment for performing a combination of garden or lawn tasks simultaneously consisting of a clamp having a first rounded portion, a second attachment portion, an inner surface, and an outer surface. The first rounded portion is adapted to be secured to a handle of a tool. The second attachment portion has an upper section and a lower section. Two apertures are formed on both the upper section and the lower section of the clamp. The two apertures on both the upper section and the lower section are in alignment with each other. Two thumb screws are adapted to be received through the apertures that are formed on both the upper section and the lower section of the clamp. The two thumb screws function to secure or release the clamp from the handle of the tool. A plurality of small spikes are integral with the inner surface of the first rounded portion of the clamp. In the preferred embodiment, the number of small spikes is actually two. The small spikes function to grasp the handle of the tool and prevent the clamp from rotating. The device contains a bracket having a generally rectangular configuration. The bracket has a lower portion, an upper portion, and two side portions. The lower portion is secured to the outer surface of the clamp. Two apertures are formed on the upper portion of the bracket. The device contains a tool head having a flat portion and a cultivating rake portion. The flat portion has two apertures formed therethrough. The two apertures correspond with the two apertures that are formed on the upper portion of the bracket. The cultivating rake portion has a plurality of vertically extending tines therefrom. Two inner thumb screws are adapted to be received through the two apertures formed on the upper portion of the bracket and the two apertures formed in the flat portion of the tool head. The two inner thumb screws function to removably secure the tool head to the bracket.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved versi-rake attachment which has all the advantages of the prior art gardening tools and none of the disadvantages.

It is another object of the present invention to provide a new and improved versi-rake attachment which may be easily and efficiently manufactured and marketed.

It is a further object of the present invention to provide a new and improved versi-rake attachment which is of durable and reliable construction.

An even further object of the present invention is to provide a new and improved versi-rake attachment which is susceptible of a low cost of manufacture with regard to both materials and labor, and which accordingly is then susceptible of low prices of sale to the consuming public, thereby making such a versi-rake attachment economically available to the buying public.

Still yet another object of the present invention is to provide a new and improved versi-rake attachment which provides in the apparatuses and methods of the prior art some of the advantages thereof, while simultaneously overcoming some of the disadvantages normally associated therewith.

Even still another object of the present invention is to provide a new and improved versi-rake attachment for performing a combination of garden or lawn tasks simultaneously.

Lastly, it is an object of the present invention to provide a new and improved versi-rake attachment comprising a clamp adapted to be secured to a handle of a tool. Two apertures are formed on the clamp. Two thumb screws are adapted to be received through the apertures formed on the clamp. The two thumb screws function to secure or release the clamp from the handle of the tool. A plurality of small spikes are integral with the clamp. The small spikes function to grasp the handle of the tool and prevent the clamp from rotating. The device contains a bracket having a generally rectangular configuration. The bracket is secured to the outer surface of the clamp. Two apertures are formed on the bracket. The device also has a tool head portion having two apertures formed therethrough. The two apertures correspond with the two apertures formed on the bracket. Two inner thumb screws are adapted to be received through the two apertures formed in the bracket and the two apertures formed in the tool head. The two inner thumb screws function to removably secure the tool head to the bracket.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
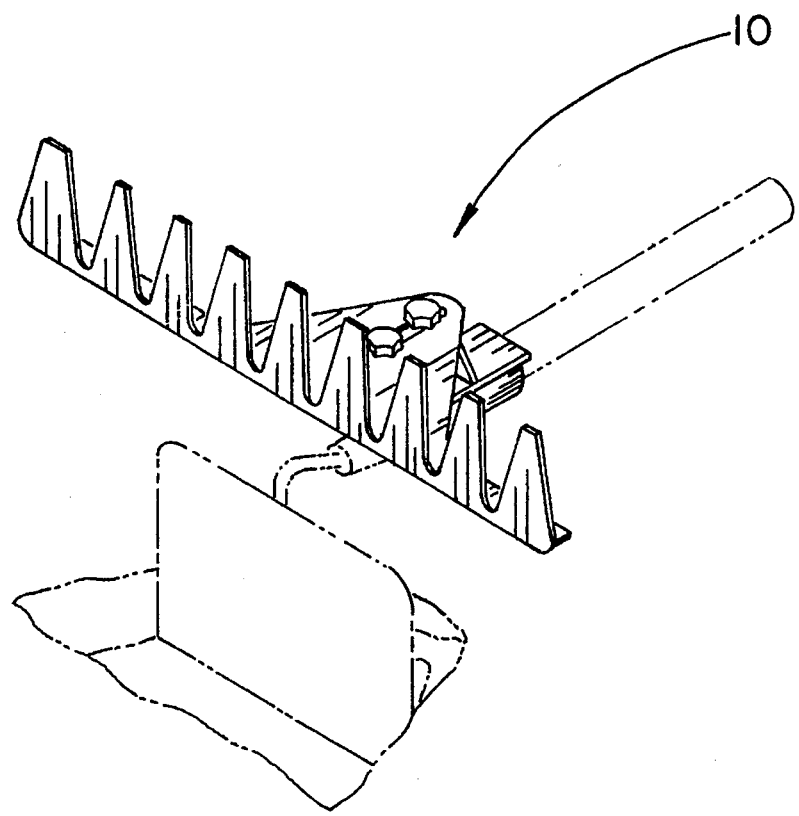
FIG. 1 is a perspective view of the preferred embodiment of the versi-rake attachment constructed in accordance with the principles of the present invention.
Figure 2:
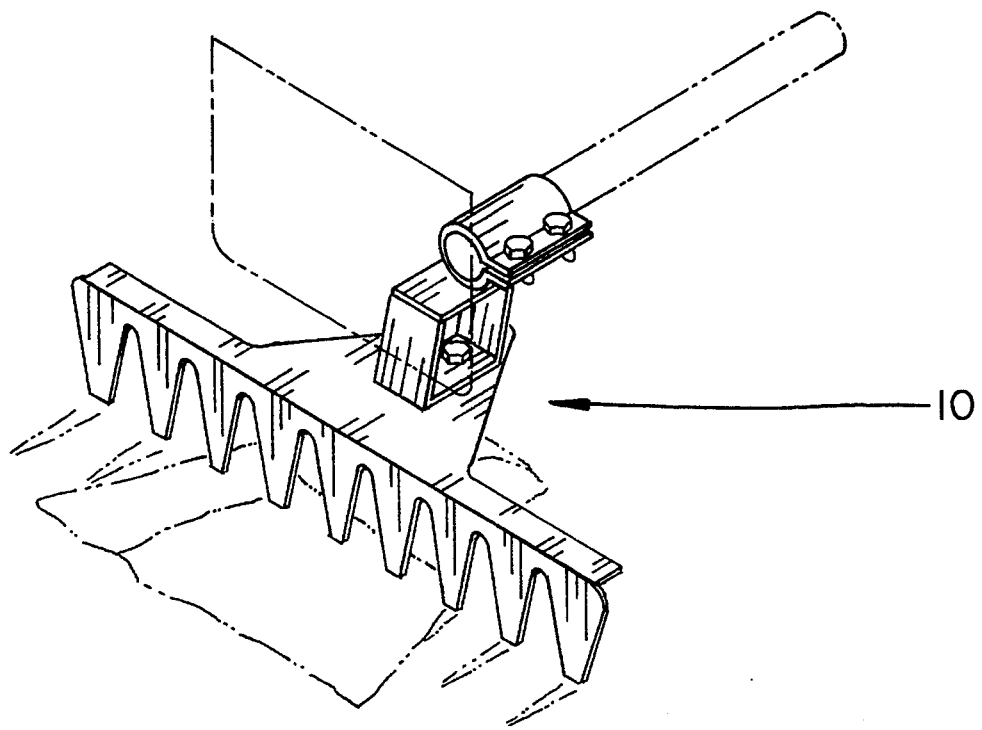
FIG. 2 is a perspective view of the preferred embodiment in accordance with the principles of the present invention.
Figure 3:
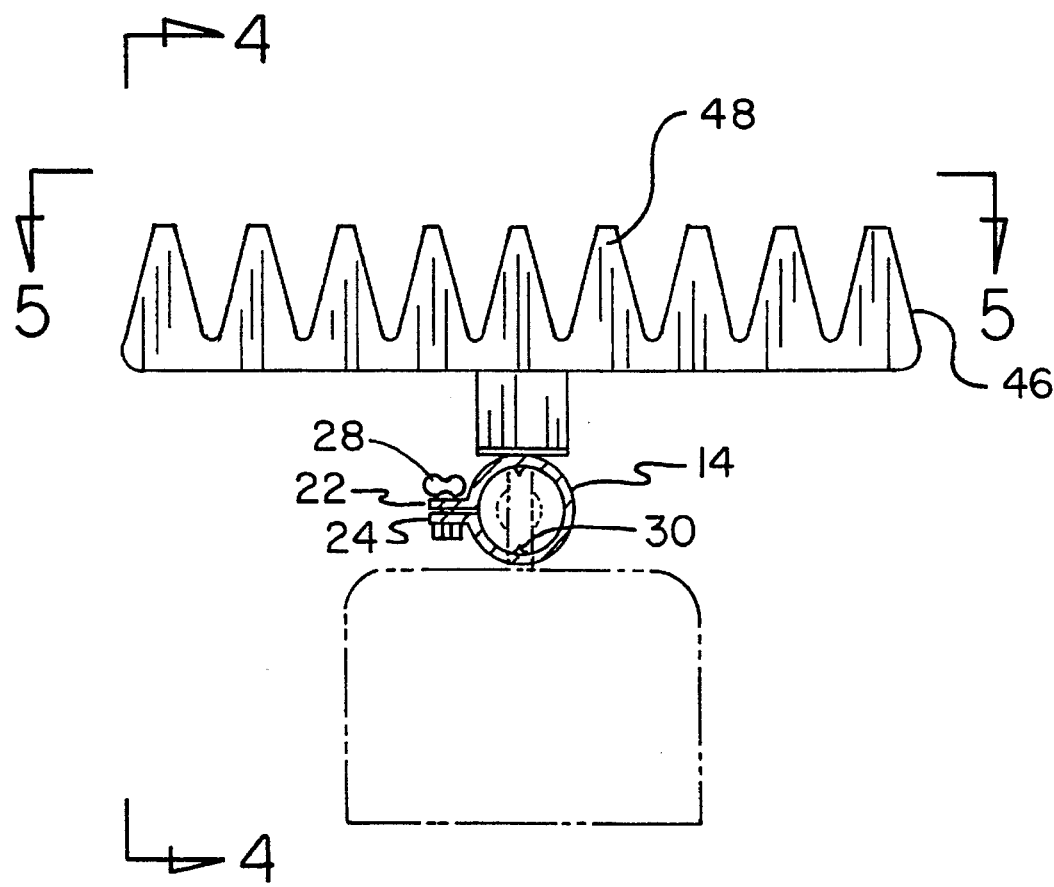
FIG. 3 is a side view of the preferred embodiment of the present invention.
Figure 4:
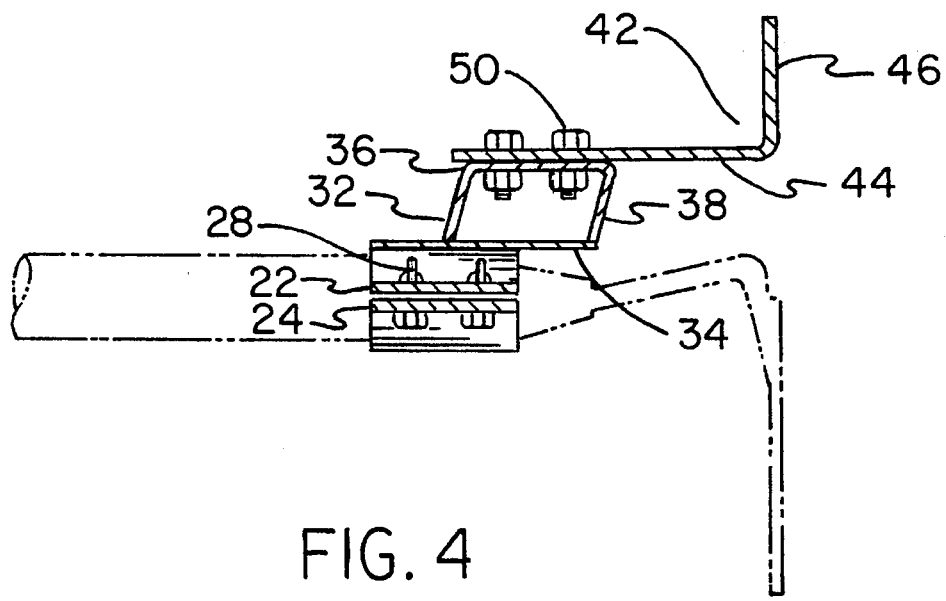
FIG. 4 is a side-sectional view as seen along line 4—4 of FIG. 3.
Figure 5:
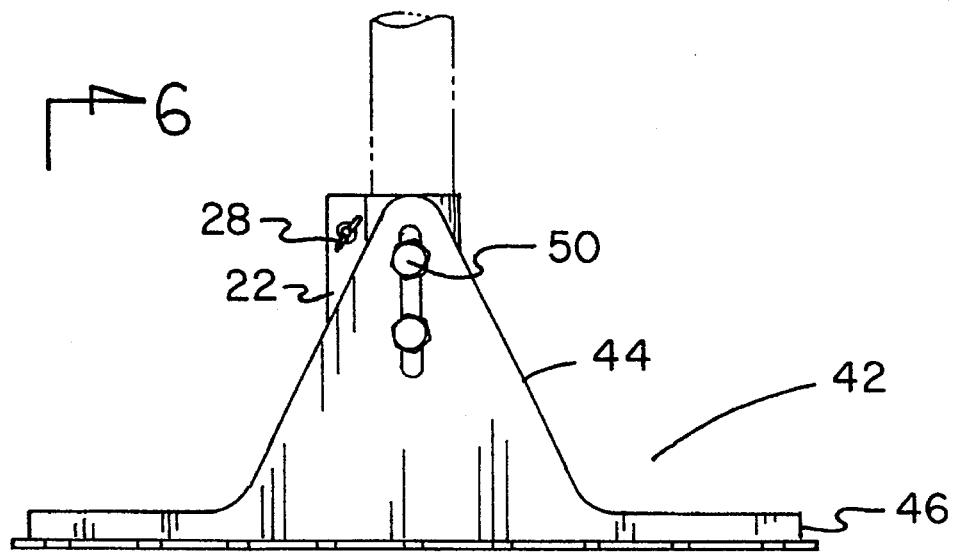
FIG. 5 is a plan view as seen along line 5—5 of FIG. 3.
Figure 6:
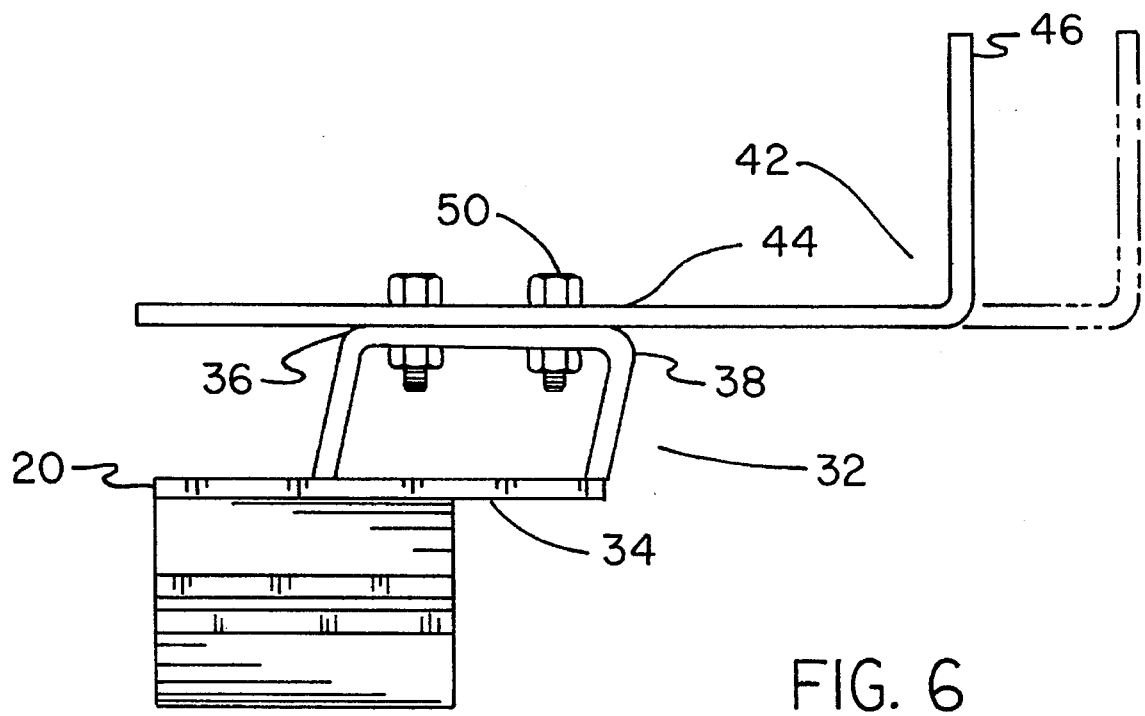
FIG. 6 is an enlarged side view as seen along line 6—6 of FIG. 5.
Figure 7:
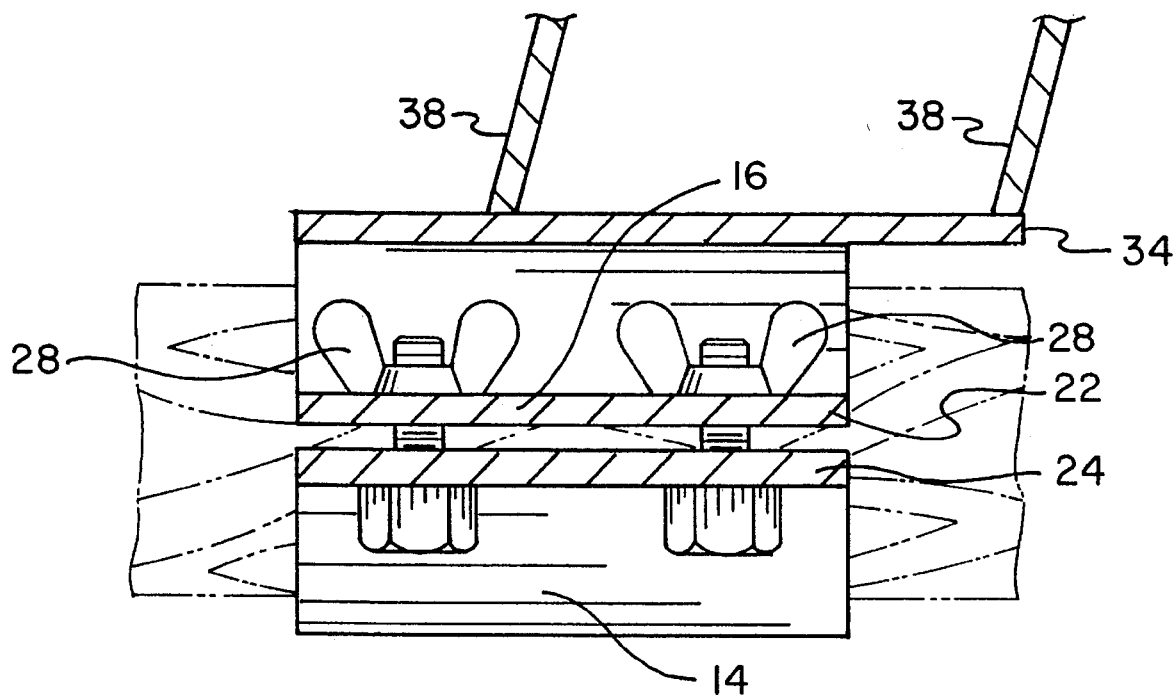
FIG. 7 is an enlarged side view of the thumb screws of the present invention.
Figure 8:
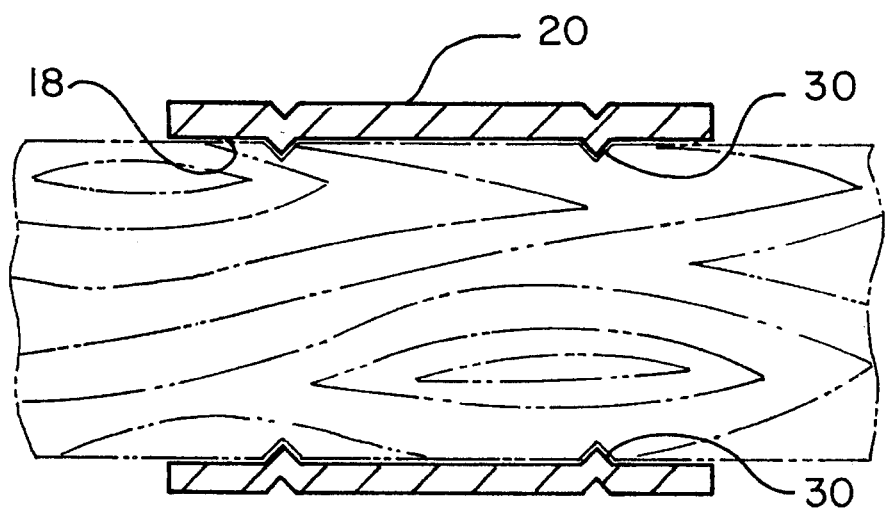
FIG. 8 is an enlarged plan view of the inner spikes of the present invention.

With reference now to the drawings, and in particular, to FIG. 1 thereof, the preferred embodiment of the new and improved versi-rake attachment embodying the principles and concepts of the present invention and generally designated by the reference number 10 will be described.

Specifically, it will be noted in the various Figures that the device relates to a versi-rake attachment for performing a combination of garden or lawn tasks simultaneously. In its broadest context, the device consists of a clamp, a plurality of small spikes, a bracket, a tool head, and two inner thumb screws.

The device 10 consists of a clamp 12 having a first rounded portion 14, a second attachment portion 16, an inner surface 18, and an outer surface 20. The first rounded portion 14 is adapted to be secured to a handle of a tool. The second attachment portion 16 has an upper section 22 and a lower section 24. Two apertures 26 are formed on both the upper section 22 and the lower section 24 of the clamp 12. The two apertures on both the upper section 22 and the lower section 24 are in alignment with each other. Two thumb screws 28 are adapted to be received through the apertures 26 that are formed on both the upper section 22 and the lower section 24 of the clamp 12. The two thumb screws 28 function to secure or release the clamp 12 from the handle of the tool.

A plurality of small spikes 30 are integral with the inner surface 18 of the first rounded portion 14 of the clamp 12. In the preferred embodiment, the number of small spikes 30 is actually two. The small spikes 30 function to grasp the handle of the tool and prevent the clamp 12 from rotating.

The device 10 contains a bracket 32 having a generally rectangular configuration. The bracket 32 has a lower portion 34, an upper portion 36, and two side portions 38. The lower portion 34 is secured to the outer surface 20 of the clamp 12. Two apertures 40 are formed on the upper portion 36 of the bracket 32.

The device 10 contains a tool head 42 having a flat portion 44 and a cultivating rake portion 46. The flat portion 44 has two apertures 48 formed therethrough. The two apertures 48 correspond with the two apertures 40 that are formed on the upper portion 36 of the bracket 32. The cultivating rake portion 46 has a plurality of vertically extending tines 48 therefrom.

Two inner thumb screws 50 are adapted to be received through the two apertures 40 formed on the upper portion 36 of the bracket 32 and the two apertures 48 formed in the flat portion 44 of the tool head 42. The two inner thumb screws 50 function to removably secure the tool head 42 to the bracket 32.

A second embodiment of the present invention includes substantially all of the components of the present invention further including wherein the tool head 42 can consist of any number of gardening or lawn maintaining tools, such as a hoe or an edging tool.

The present invention is designed to perform a combination of garden or lawn tasks simultaneously. It is comprised of a clamp, a bracket and a tool, or series of tools. The clamp is similar to those used as automotive hose clamps, and it can be placed permanently around the handle of any garden tool. Two small spikes, extending from the inside diameter of the clamp, serve to prevent any rotation of the clamp relative to the handle. The bracket is attached to one side of the clamp and terminates in a rectangular opening with two threaded holes. The present invention is attached to the bracket using two thumb screws.

The tool head in this particular version of the invention is a cultivating rake, and is available in various sizes. Any combination of tools may be used. For example, if one is working with a hoe, a rake head may also be attached. In this fashion, one may dislodge weeds and subsequently rake them away without having to leave the work area to find the second tool.

Many steps are saved and it is no longer necessary to have a vast array of garden implements. Loosening the thumb screws facilitates the exchange of tools, and any combination best suiting the task at hand can be employed. Another valuable combination would be an edging tool with a rake. The present invention should be a valuable acquisition for gardeners, landscapers, horticulturists and anyone who enjoys working in their yard.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved versi-rake attachment for performing a combination of garden or lawn tasks simultaneously comprising, in combination:

a clamp having a first rounded portion, a second attachment portion, an inner surface, and an outer surface, the first rounded portion adapted to be secured to a handle of a tool, the second attachment portion having an upper section and a lower section, two apertures formed on both the upper section and the lower section of the clamp, the two apertures on both the upper section and the lower section in alignment with each other, two thumb screws adapted to be received through the apertures formed on both the upper section and the lower section of the clamp, the two thumb screws functioning to secure or release the clamp from the handle of the tool;

a plurality of small spikes integral with the inner surface of the first rounded portion of the clamp, the small spikes functioning to grasp the handle of the tool and prevent the clamp from rotating;

a bracket having a generally rectangular configuration, the bracket having a lower portion, an upper portion, and two side portions, the lower portion secured to the outer surface of the clamp, two apertures formed on the upper portion of the bracket;

a tool head having a flat portion and a cultivating rake portion, the flat portion having two apertures formed therethrough, the two apertures corresponding with the two apertures formed on the upper portion of the bracket, the cultivating rake portion having a plurality of vertically extending tines therefrom; and two inner thumb screws adapted to be received through the two apertures formed in the upper portion of the bracket and the two apertures formed in the flat portion of the tool head, the two inner thumb screws functioning to removably secure the tool head to the bracket.

2. The device as described in claim 1 wherein the plurality of small spikes is two.

\* \* \* \* \*